United States Patent [19]
Goss et al.

[11] Patent Number: 5,599,039
[45] Date of Patent: Feb. 4, 1997

[54] SPRING RETAINER AIR BAG MOUNTING DEVICE

[75] Inventors: David C. Goss, Rockford; Steven P. Donovan, Roscoe, both of Ill.

[73] Assignee: Textron Inc., Providence, R.I.

[21] Appl. No.: 505,399

[22] Filed: Jul. 21, 1995

[51] Int. Cl.$^6$ ..................................... B60R 21/16
[52] U.S. Cl. ........................ 280/728.2; 280/731
[58] Field of Search ................... 280/728.2, 731

[56] References Cited

U.S. PATENT DOCUMENTS

| | | | |
|---|---|---|---|
| 5,199,834 | 4/1993 | Seidl et al. | 411/5 |
| 5,338,060 | 8/1994 | Soderquist | 280/728.2 |
| 5,409,256 | 4/1995 | Gordon et al. | 280/728.2 |
| 5,435,594 | 7/1995 | Gille | 280/728.2 |

*Primary Examiner*—Kenneth R. Rice
*Attorney, Agent, or Firm*—Trexler, Bushnell, Giangiorgi & Blackstone, Ltd.

[57] ABSTRACT

A fastening assembly for mounting an inflatable module on a vehicle includes a support structure arranged for securing the inflatable module to a vehicle component for the like, and a coupling member projecting from the support structure and provided with a coupling aperture. Insertable into the coupling aperture is a further coupling element which is secured to the vehicle component and the coupling insertion secures fastening of the module to the vehicle component. In one embodiment, the coupling member includes an arm having a cam-following portion arranged for camming engagement against a coupling tongue on the vehicle component so that the camming engagement produces deflection of the coupling arm until the coupling aperture reversely deflects in snap-action bringing insertion of the tongue therethrough into a wedged, locking position which prevents withdrawal of the inflatable module in the mounted position, for example in the steering wheel hub.

15 Claims, 2 Drawing Sheets

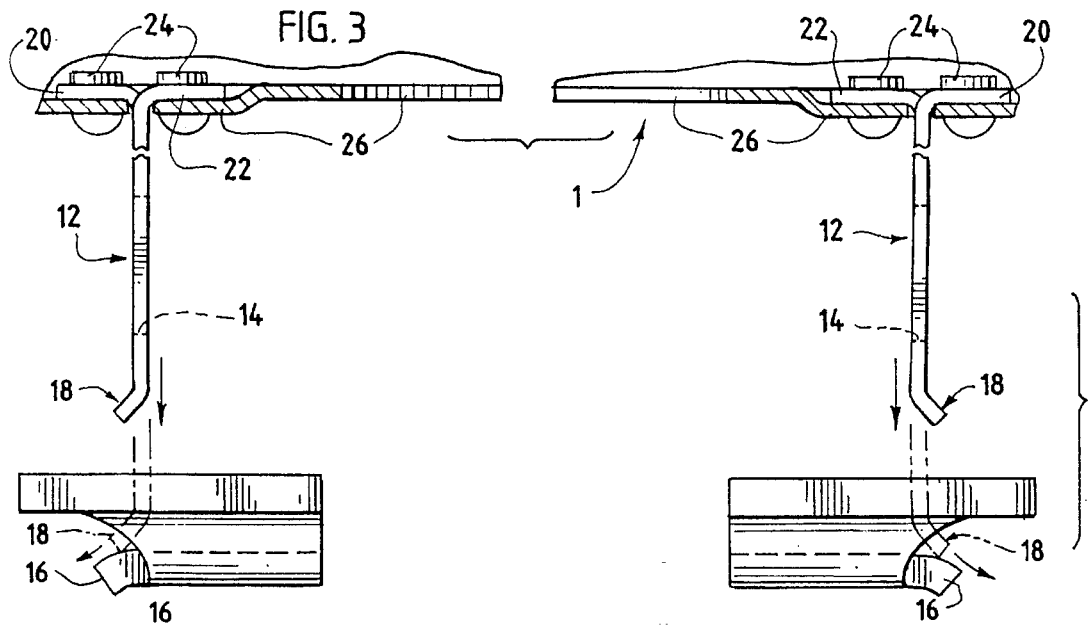
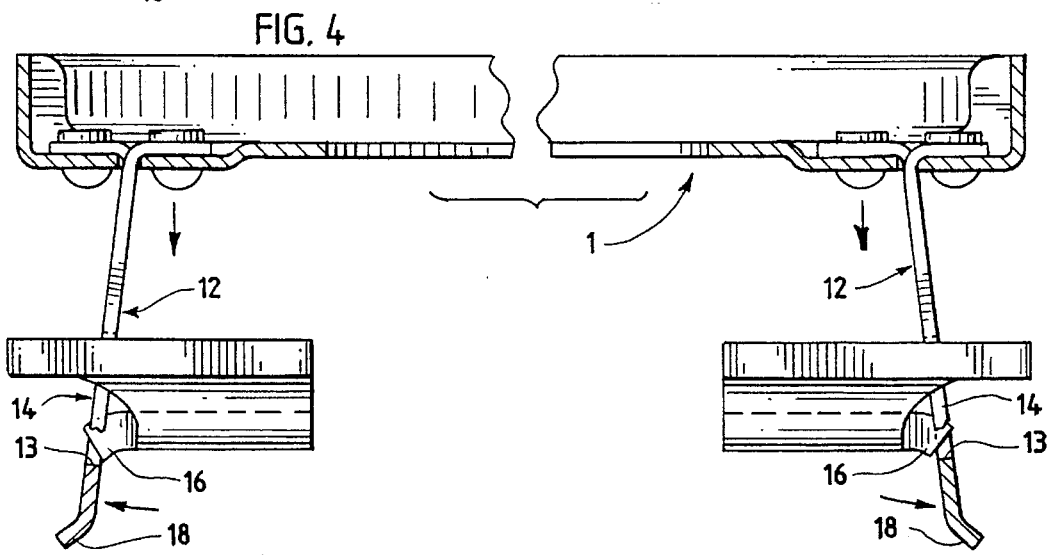
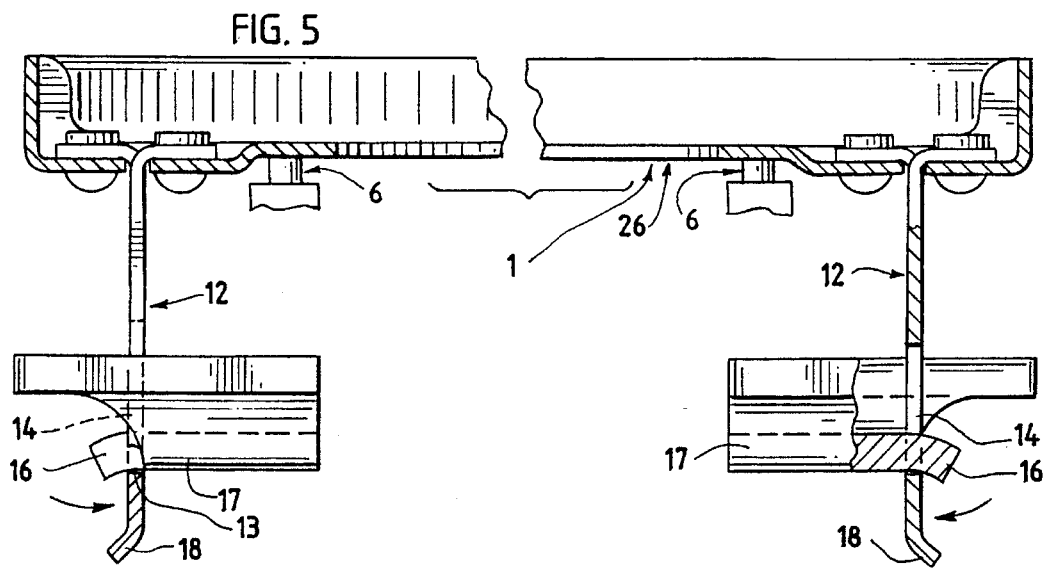

SPRING RETAINER AIR BAG MOUNTING DEVICE

BACKGROUND

This invention relates to fastening assemblies for mounting protective modules containing inflatable restraint bags in passenger vehicles, and more particularly relates to rapid, push-in securement of the module without need for handling of separate fasteners and tools.

Preassembled, inflatable, "air bag" modules are typically delivered to vehicle manufacturers and then mounted as a unit to a vehicle component such as a steering wheel, dashboard or side door, along the vehicle assembly line. U.S. Pat. No. 5,005,860 describes an air bag mounting arrangement using spring claws to stabilize positioning of the air bag housing prior to fastening the housing onto the steering wheel hub with screw fasteners. In the effort to eliminate conventional fastening tools and fasteners for mounting the air bag module, U.S. Pat. No. 5,333,897 describes use of spring-loaded, push-cat couplers which have complex fabrication and construction. Improved simplicity in both manufacturing and assembly are achieved by the module fastening subject of the present invention.

The prior art designs require either the use of fasteners or specifically constructed components to attain engagement of the module with steering wheel hub or underlying struts. The purpose of the present invention is to provide for the snap fitting of the air bag housing module to the steering wheel utilizing an arrangement that can be fabricated readily and without use of expensive components.

SUMMARY OF THE INVENTION

In accordance with the present invention, a fastening assembly for mounting an inflatable module on a vehicle includes a support structure arranged for securing the inflatable module to a vehicle component, for example, a steering wheel hub or the like, and coupling members projecting from the support structure and each provided with a coupling aperture. Insertable into the coupling aperture is a further coupling element which is secured to the vehicle component, with the insertion securing and fastening the module to the vehicle component. In the illustrated embodiment of the invention, the coupling member includes a resilient arm having a cam-following portion arranged for camming engagement against a coupling tongue on the vehicle component so that the camming engagement produces deflection of the coupling arm until the coupling aperture reversely deflects in snap-action bringing insertion of the tongue therethrough into a wedged, locking position which prevents withdrawal of the inflatable module in the mounted position, for example in the steering wheel hub. This engagement in combination with the resilient mounting of the module to the underlying vehicle structure will secure the module in place.

BRIEF DESCRIPTION ON THE DRAWINGS

FIGS. 3–5 are partially sectional views illustrating sequential progression in coupling of the fastening assembly shown in FIGS. 1 and 2.

DESCRIPTION OF THE PREFERRED EMBODIMENTS

Figure 1:
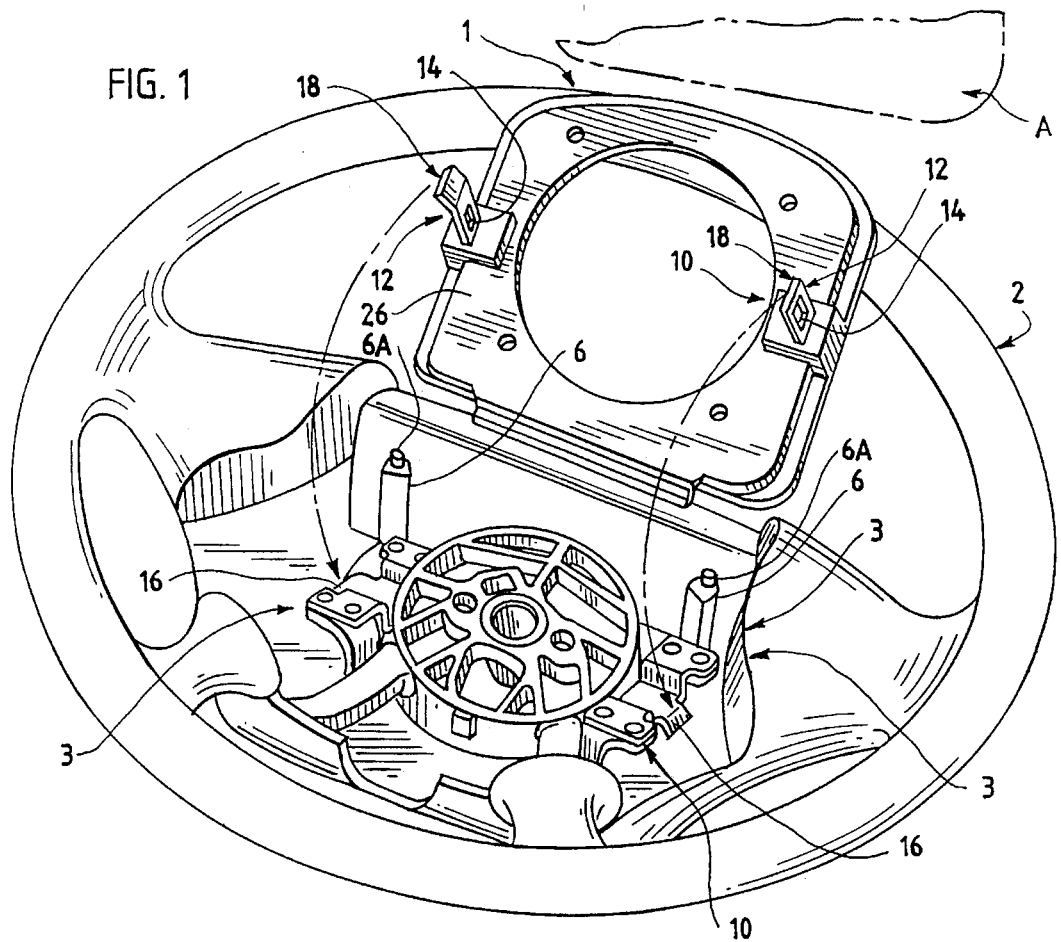
FIG. 1 is a perspective view of one embodiment of a fastening assembly prior to securement- in accordance with the present invention, illustrating an inflatable restraint bag and housing module to be mounted on the hub of a vehicle steering wheel.
Figure 2:
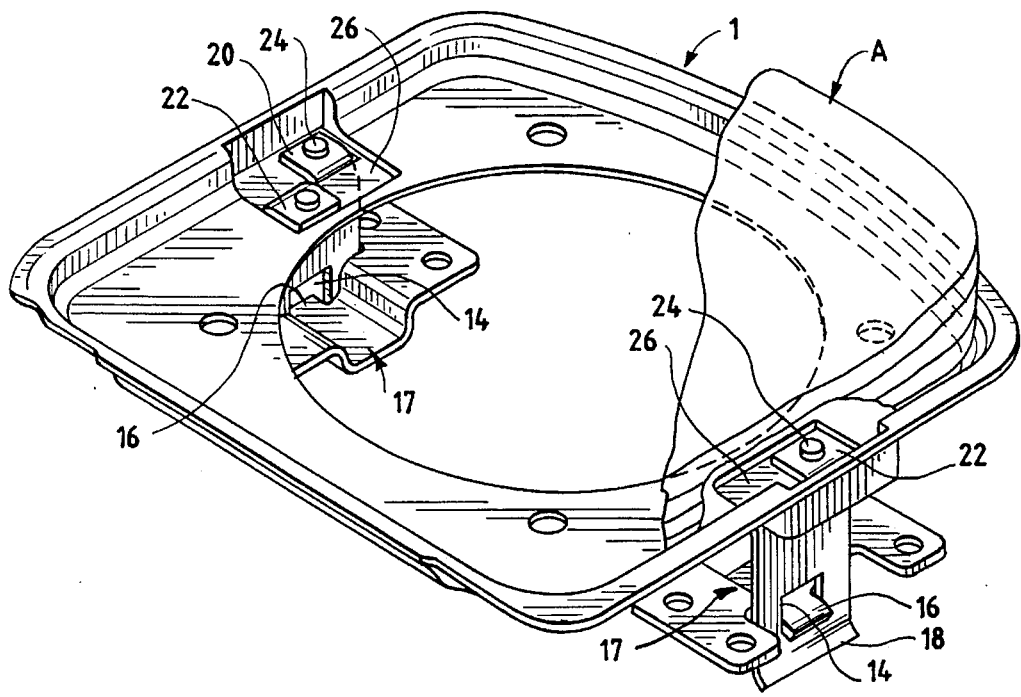
FIG. 2 is a perspective view of the secured fastening assembly shown in FIG. 1 in which the housing is partially fragmentary and the securing wheel hub has been omitted for clarity of the fastening assembly.

Referring initially to FIGS. 1 and 2, an embodiment of the fastening assembly 10 in accordance with the present invention is illustrated for securing a modular housing 1 for an inflatable, restraint bag A to a vehicle steering wheel construction 2. In this regard, it should be noted that the steering wheel construction 2, includes two pairs of mounting pillars 6 (only one pair shown) which include resilient stops 6A. The module housing 1 is supported upon the mounting holes 6 and the stops 6A provided a resilient biasing. It should be noted that the fastening assembly 10 could also be employed for securing the bag module housing 1 to other vehicle components, for example, a dashboard or a side door, and therefore the fastening assembly according to the present invention is versatilely employable particularly in any application where a "push-in" securement is desirable to eliminate need for access panels or separate fasteners and tools.

As shown in FIG. 1 which illustrates the fastening assembly or system prior to securement, the fastening assembly includes at least a pair of spaced, coupling arms 12 mounted on the underside of the inflatable module housing 1. The coupling arms 12 are resilient and may be characterized as leaf-spring type arms. Referring particularly to FIGS. 2 and 3, each of the coupling arms 12 also has offset mounting flange portions 20,22 which are riveted at 24, or otherwise fixed to the underside housing panel 26 of the modular housing 1. The coupling arms 12 each have a coupling or locking aperture 14 which receives a respective locking tongue 16 mounted in the hub portion 3 of the steering wheel 2. Each of the coupling arms 12 has a foot portion 18 forming the projecting end thereof, and axially spread from the aperture 14. Each foot portion 18 has been bent or defected outwardly to provide a camming surface, as will be explained more fully hereinafter.

In initiating the mounting operation, as more fully described hereinafter, the bent feet 18 are generally aligned with the respective locking tongues 16 so that the coupling arms 12 need only be moved inwardly or downwardly to engage the feet 18 against the tongues 16. Referring again to FIG. 3, after initial alignment beginning the mounting operation, the bent feet 18, 18 engage the respective tongues 16, 16 and continued force on the module 1 causes the coupling arms 12 to deflect outwardly in a cam-action against the stationary tongues 16, 16 as shown in the phantom positions of the feet 18 in FIG. 3. The progressive outwardly cammed deflection of the feet 18 with continued force on the module 1 brings the lower edge 13 of the coupling aperture 14 to the tongue 16 shown in FIG. 4. With continued pushing as shown in FIG. 5, the disengagement of the lower aperture edge 13 from the tongue 16 allows the reactive spring-force of the outward deflection to produce a reverse, inward deflection of the arm 12 and aperture 14 to achieve insertion therethrough of the tongue 16 in snap-action arriving at the position in FIG. 5 in which the bottom aperture edge 13 has become wedged in locking engagement against the bottom surface of the tongue 16 generally where it meets the bracket 17. Thus, the arms 12 are initially sprung outwardly by the camming action of the tongues 16 on the portions 18, which are in effect cam followers. The resilient nature of the arms 12 allow said arms to spring back to their initial position once the tongues 16 are engaged in operation 14. Thereafter, the wedged locking of the arms 12 by the respective bracket tongues 16 prevents retraction of the module I from the hub brackets 17. Deliberate dismounting of the module I requires outward deflection of the arms, such as by tooling, in order to withdraw the tongues 16 from the respective coupling apertures 14.

Also as shown in the locked position of the module 1 in FIG. 5, the bottom module panel 26 is seated upon four resilient or robber-tipped pillars or stops 6 (two shown) provided in the wheel hub 3 (FIG. 1) so that the module 1 cannot be pushed further into the hub 3 and is securely locked into the correctly mounted position as shown in FIG. 5. Thus, once the aperture 14 in arms 12 are engaged by the tongues 16, this engagement coupled with the resilient upwardly biasing force provided by the resilient pillars 6 maintains the module in position.

As illustrated, the secure fastening of the module 1 is shown mounted on the vehicle steering wheel hub, however, the locking tongues 16 and bracket 17 could be provided on a dashboard assembly or a side door assembly as well as any other suitable vehicle component in order to locate the inflatable, restraint bag A in other protective positions. Additionally, the fastening assembly of the present invention could be employed to secure other suitable types of equipment, particularly where rapid fastening without separate fasteners is important.

While a preferred embodiment of the present invention is shown and described, it is envisioned that those skilled in the art may devise various modifications and equivalents without departing from the spirit and scope of the appended claims.

The invention claimed is:

1. A fastening assembly for mounting an inflatable module on a vehicle comprising: a support structure arranged for securing the inflatable module to a vehicle component or the like; a coupling member projecting from said support structure and being flexible to accommodate any misalignment thereof and to facilitate assembly thereof and having a coupling aperture; and a coupling element securable to said vehicle component, and arranged for coupling insertion into said coupling aperture to secure fastening of said module to said vehicle component.

2. A fastening assembly according to claim 1, wherein said coupling member comprises a cam-following portion thereof arranged for camming engagement against said coupling element prior to insertion thereof into said coupling aperture.

3. A fastening assembly according to claim 2, wherein said camming engagement produces deflection of said coupling member.

4. A fastening assembly according to claim 3, wherein said coupling aperture is arranged for insertion therein of said coupling tongue upon termination of said camming engagement.

5. A fastening assembly according to claim 4, wherein said camming engagement termination enables reverse deflection of said coupling member relative to said camming deflection thereof.

6. A fastening assembly according to claim 1, wherein said cam-following portion comprises a bent portion of said coupling member.

7. A fastening assembly according to claim 6, wherein said coupling element comprises a tongue portion thereof having a conforming inclination relative to said bent, cam-following portion of said coupling member.

8. A fastening assembly according to claim 2, wherein said coupling member has one end thereof fixed to said support structure and a second end thereof defining said cam-following portion and said coupling aperture medially arranged between said first and second ends.

9. A fastening assembly according to claim 1, wherein said coupling element comprises a tongue portion projecting from a mounting bracket securable to said vehicle component.

10. A fastening assembly according to claim 2, wherein said coupling aperture is movable relative to said coupling element during said coupling insertion.

11. A fastening assembly according to claim 10, wherein said coupling aperture movement comprises snap-action thereof relative to said coupling element.

12. A fastening assembly according to claim 1, wherein said coupling aperture is formed through said coupling member enabling coupling insertion of said coupling element therethrough.

13. A fastening assembly according to claim 1, wherein said coupling element is wedged against a peripheral surface of said coupling aperture in locked relative positions thereof defining said secure module fastening.

14. A fastening assembly according to claim 1 further including resilient support member engaging said module to bias said module in a direction opposite that employed in assembly thereof to said vehicle component.

15. A fastening assembly for mounting an inflatable module to a vehicle, comprising:

(a) a support structure for the inflatable module which support structure will be mounted to a vehicle structure, said fastening assembly further comprising (b) a first coupling component carded by said support structure and being flexible to accommodate any misalignment and to facilitate assembly, (c) a second coupling component adapted to be carried by the vehicle structure, said first and second coupling components being engageable with a snap-fit locking engagement with one of said components including an aperture and the other of said components including a tongue member disposable in said aperture to attain said snap-fit locking engagement.

* * * * *

UNITED STATES PATENT AND TRADEMARK OFFICE
CERTIFICATE OF CORRECTION

PATENT NO. : 5,599,039
DATED : February 4, 1997
INVENTOR(S) : David C. Goss and Steven P. Donovan It is certified that error appears in the above-indentified patent and that said Letters Patent is hereby corrected as shown below:

Column 4, Line 46 "carded" should be -- carried --

Signed and Sealed this

Thirteenth Day of May, 1997

*Attest:*

BRUCE LEHMAN

*Attesting Officer*     *Commissioner of Patents and Trademarks*